(12) United States Patent
Kim et al.

(10) Patent No.: US 8,519,637 B2
(45) Date of Patent: Aug. 27, 2013

(54) DIGITAL PWM GENERATOR AND APPARATUS FOR DRIVING LIGHT EMITTING DEVICE

(75) Inventors: Jung Hyun Kim, Gyunggi-do (KR); Bo Hyun Hwang, Seoul (KR); Jung Sun Kwon, Gyunggi-do (KR); Seung Kon Kong, Gyunggi-do (KR); Jae Shin Lee, Gyunggi-do (KR); Joon Youp Sung, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 289 days.

(21) Appl. No.: 13/069,558

(22) Filed: Mar. 23, 2011

(65) Prior Publication Data

US 2012/0161662 A1 Jun. 28, 2012

(30) Foreign Application Priority Data

Dec. 24, 2010 (KR) ........................ 10-2010-0134613

(51) Int. Cl.
*H05B 37/02* (2006.01)
(52) U.S. Cl.
USPC ............................ 315/291; 315/297; 315/307
(58) Field of Classification Search
USPC .................. 315/291, 294, 297, 307
See application file for complete search history.

(56) References Cited

U.S. PATENT DOCUMENTS

| 7,554,310 B2 * | 6/2009 | Chapuis et al. | 323/282 |
| 2006/0164366 A1 | 7/2006 | Yu et al. | |
| 2006/0214603 A1 * | 9/2006 | Oh et al. | 315/246 |
| 2008/0179498 A1 | 7/2008 | Shimizu | |
| 2011/0279060 A1 * | 11/2011 | Wang | 315/297 |

FOREIGN PATENT DOCUMENTS

| JP | 2008104287 A | 5/2008 |
| JP | 2008192324 A | 8/2008 |
| JP | 2010115066 A | 5/2010 |
| JP | 2010244815 A | 10/2010 |
| KR | 1020070075774 A | 7/2007 |

* cited by examiner

*Primary Examiner* — Jason M Crawford
(74) *Attorney, Agent, or Firm* — Lowe, Hauptman & Ham

(57) ABSTRACT

There is provided a digital PWM generator according to a first exemplary embodiment of the present invention including: an A/D converter dividing a predetermined reference voltage into a plurality of sections corresponding to a predetermined first set value, searching a section to which the magnitude of an input voltage Vin corresponds, among the plurality of sections, and converting a value corresponding to the searched section into a digital signal; a frequency selector providing a counting number by counting a predetermined high-speed counting clock during a one-cycle section of a predetermined reference clock; and a PWM signal generator converting the digital signal from the A/D converter into a ratio value corresponding to a ratio for the reference voltage and generating a PWM signal having a controlled duty ratio of the reference clock by using the ratio value and the counting number from the frequency selector.

18 Claims, 3 Drawing Sheets

DIGITAL PWM GENERATOR AND APPARATUS FOR DRIVING LIGHT EMITTING DEVICE

CROSS-REFERENCE TO RELATED APPLICATIONS

This application claims the priority of Korean Patent Application No. 10-2010-0134613 filed on Dec. 24, 2010, in the Korean Intellectual Property Office, the disclosure of which is incorporated herein by reference.

BACKGROUND OF THE INVENTION

1. Field of the Invention

The present invention relates to a digital PWM generator and an apparatus for driving a light emitting device that can be applied to a light emitting diode (LED), a backlight unit (BLU), or the like, and precisely controlled.

2. Description of the Related Art

In general, a light emitting element such as an LED or the like can use a pulse width modulation (PWM) driving circuit in order to control the luminance thereof. Herein, a PWM scheme can control a current flowing in the light emitting element by controlling a high section within one cycle of a PWM control signal to 0 to 100%.

As described above, in a known LED driving apparatus using the PWM scheme, as a percentage of an on section within one cycle of a PWM signal increases, optical brightness within the LED increases.

That is, the PWM signal having a duty ratio controlled to have a desired luminance is generated and provided to a switching element so as to control the optical brightness of the LED.

For such an operation, the LED driving apparatus includes a driving circuit controlling the current flowing in the LED and a PWM signal generator generating the PWM signal having a duty ratio suitable for a desired luminance in order to drive the LED.

However, the known PWM driving circuit has the following defects when the known PWM driving circuit has the PWM signal generator included therein.

That is, in the case of a known internal PWM scheme, when a phase locked loop (PLL) is not used for miniaturization and low cost, a clock frequency is not accurately locked, and as a result, a waterfall phenomenon in which a stripe flows down on a screen occurs.

Further, when the phase locked loop (PLL) is used in order to remove the waterfall phenomenon, the waterfall phenomenon can be enhanced, but since the PLL has its own frequency offset due to the use of the PLL for accurate frequency locking, a frequency offset is generated between a clock of a system and the PWM signal.

Furthermore, fine duty control may be limited due to a constraint such as an offset or a response speed of a comparator used to generate the PWM signal.

SUMMARY OF THE INVENTION

An aspect of the present invention provides a digital PWM generator and an apparatus for driving a light emitting device that a minute PWM signal can be generated by generating a PWM signal based on a digital signal acquired by analog/digital (A/D)-converting an input voltage to generate so as to minutely control an adopted system.

According to an aspect of the present invention, there is provided a digital PWM generator including: an A/D converter dividing a predetermined reference voltage into a plurality of sections corresponding to a predetermined first set value, searching a section to which the magnitude of an input voltage corresponds, among the plurality of sections, and converting a value corresponding to the searched section into a digital signal; a frequency selector providing a counting number by counting a high-speed counting clock of which the cycle is set to be shorter than that of the cycle of the reference clock during a one-cycle section of a predetermined reference clock; and a PWM signal generator converting the digital signal from the A/D converter into a ratio value corresponding to a ratio for the reference voltage and generating a PWM signal having a controlled duty ratio of the reference clock by using the ratio value and the counting number from the frequency selector.

According to another aspect of the present invention, there is provided an apparatus for driving a light emitting device, the apparatus, the apparatus including: a constant current circuit unit controlling a current flowing in a light emitting unit including a plurality of light emitting elements; an A/D converter dividing a predetermined reference voltage into a plurality of sections corresponding to a predetermined first set value and converting a value corresponding to a section to which the magnitude of an input voltage corresponds, among the plurality of sections, into a digital signal; a frequency selector providing a counting number by counting a predetermined high-speed counting clock during a one-cycle section of a predetermined reference clock; and a PWM signal generator converting the digital signal from the A/D converter into a ratio value corresponding to a ratio for the reference voltage and generating a PWM signal having a controlled duty ratio of the reference clock by using the ratio value and the counting number from the frequency selector and providing the generated PWM signal to the constant current circuit unit.

The first set value may be set to be a value corresponding to an A/D conversion resolution of the A/D converter.

The frequency selector may set the cycle of the high-speed counting clock to be shorter than the cycle of the reference clock.

The PWM signal generator may convert the digital signal from the A/D converter into a ratio value corresponding to a ratio for the reference voltage and generate a PWM signal in which a section corresponding to a value generated by multiplying the counting number from the frequency selector by the ratio value is set to be a high section in one cycle of the reference clock and the remainder section of one cycle of the reference clock is set to be a low section.

The PWM signal generator may set the high section of the PWM signal to be a section including the number of high-speed counting clocks corresponding to an integer in the value acquired by multiplying the ratio value by the counting number and set the low section in the PWM signal to a section including the number of high-speed counting clocks corresponding to a value acquired by subtracting the number of high-speed counting clocks of the high section from the total count number in a one-cycle section of the reference clock.

The PWM signal generator may include: a ratio calculating unit calculating a ratio of an input voltage Vin equivalent to a full-scale range of the A/D converter; a multiplying unit multiplying the counting number from the frequency selector by the ratio value from the ratio calculating unit; and a PWM generator determining a multiplication value calculated by the multiplying unit as a width of a high section, and generating a PWM signal maintained as a high level corresponding to the width of the high section during one cycle of a PWM and maintained as a low level in the remainder section of one cycle of the PWM.

The constant current circuit unit may include: a first MOS transistor having a gate, a source, and a drain that is connected to one terminal of the light emitting unit having the one terminal and the other terminal, the other terminal being connected to a power supply terminal receiving an operating power; a first resistor connected between a source and of the first MOS transistor and a ground; and an amplifier having a first input terminal receiving a voltage detected by the first resistor, a second input terminal receiving a predetermined voltage, and an output terminal outputting a difference voltage corresponding to an error between a voltage through the first input terminal and a voltage through the second input terminal.

In addition, the light emitting element of the light emitting unit may be constituted by an LED device.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
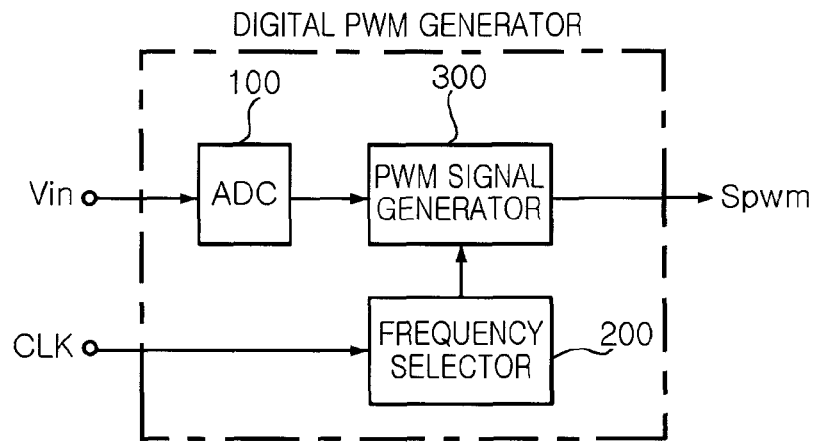
FIG. 1 is a block diagram of a digital PWM generator according to a first exemplary embodiment of the present invention.

Hereinafter, exemplary embodiments of the present invention will be described in detail with reference to the accompanying drawings.

However, the exemplary embodiments of the present invention may be modified in various forms and the scope of the present invention is not limited to the exemplary embodiments described below. Exemplary embodiments of the present invention are provided so that those skilled in the art may more completely understand the present invention. Accordingly, the shapes and sizes of elements in the drawings may be exaggerated for clarity and like reference numerals refer to like elements throughout the drawings.

FIG. 1 is a block diagram of a digital PWM generator according to a first exemplary embodiment of the present invention.

Referring to FIG. 1, a digital PWM generator according to a first exemplary embodiment of the present invention may include an A/D converter 100 dividing a predetermined reference voltage Vref into a plurality of sections corresponding to a predetermined first set value and converting a value corresponding to a section to which the magnitude of an input voltage Vin corresponds among the plurality of sections into a digital signal, a frequency selector 200 providing a counting number CTN by counting a predetermined high-speed counting clock HCLK during a one-cycle section of a predetermined reference clock CLK, and a PWM signal generator 300 converting the digital signal from the A/D converter 100 into a ratio value corresponding to a ratio for the reference voltage and generating a PWM signal Spwm having a controlled duty ratio of the reference clock CLK by using the ratio value and the counting number CTN from the frequency selector 200.

Herein, the first set value may be set to be a value corresponding to an A/D conversion resolution of the A/D converter 100.

Figure 2:
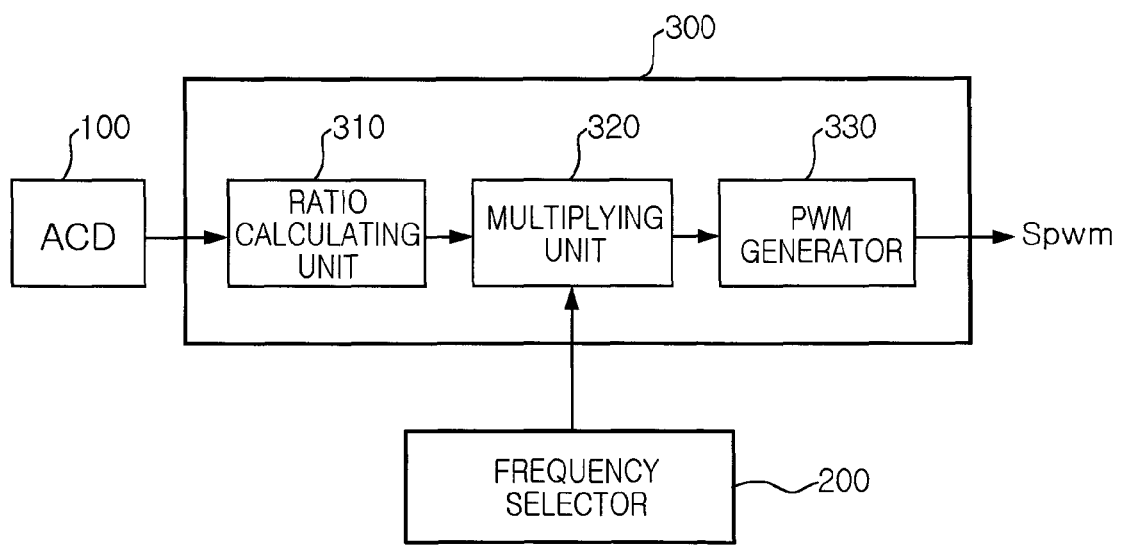
FIG. 2 is a configuration diagram of a PWM signal generator according to an exemplary embodiment of the present invention.

FIG. 2 is a configuration diagram of a PWM signal generator according to an exemplary embodiment of the present invention.

Referring to FIG. 2, The PWM signal generator 300 may include a ratio calculating unit 310 calculating a ratio (Vin/FSR=DRV) of an input voltage Vin equivalent to a full-scale range FSR of the A/D converter 100, a multiplying unit 320 multiplying the counting number CTN from the frequency selector 200 by the ratio value DRV from the ratio calculating unit 310, and a PWM generator 330 determining a multiplication value calculated by the multiplying unit 320 as a width of a high section, and generating a PWM signal maintained as a high level, corresponding to the width of the high section during one cycle of a PWM and maintained as a low level in the remainder section of the one cycle of the PWM.

Figure 3:
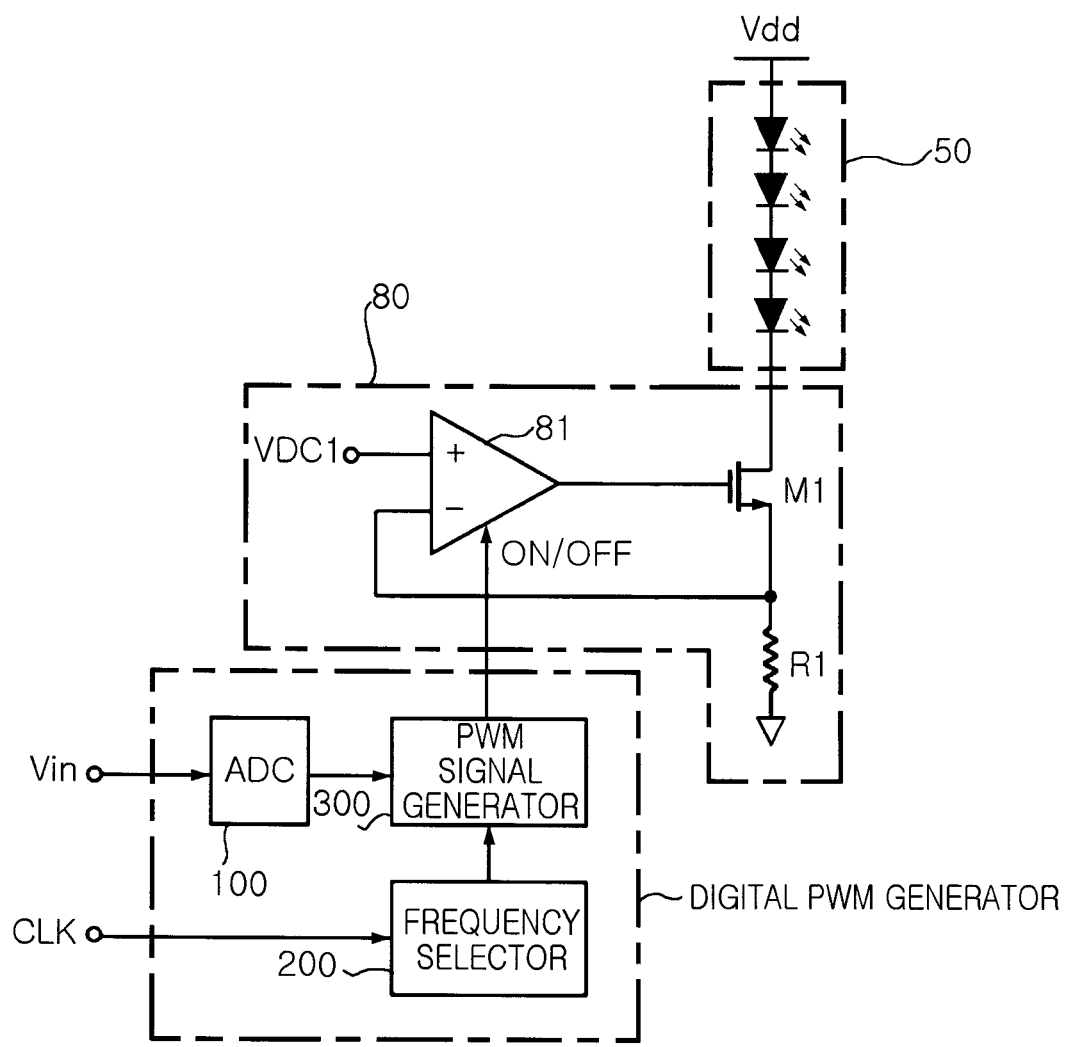
FIG. 3 is a block diagram of an apparatus for driving a light emitting device according to a second exemplary embodiment of the present invention.

FIG. 3 is a block diagram of an apparatus for driving a light emitting device according to a second exemplary embodiment of the present invention.

Referring to FIG. 3, an apparatus for driving a light emitting device according to second exemplary embodiment of the present invention may include a constant current circuit unit 80 controlling a current flowing in a light emitting unit 50 including a plurality of light emitting elements, an A/D converter 100 dividing a predetermined reference voltage Vref into a plurality of sections corresponding to a predetermined first set value and converting a value corresponding to a section to which the magnitude of an input voltage Vin corresponds among the plurality of sections into a digital signal, a frequency selector 200 providing a counting number CTN by counting a predetermined high-speed counting clock HCLK during a one-cycle section of a predetermined reference clock CLK, and a PWM signal generator 300 converting the digital signal from the A/D converter 100 into a ratio value corresponding to a ratio for the reference voltage and generating a PWM signal Spwm having a controlled duty ratio of the reference clock CLK by using the ratio value and the counting number CTN from the frequency selector 200 and providing the generated PWM signal Spwm to the constant current circuit unit 80.

The constant current circuit unit 80 may include a first MOS transistor M1 having a drain, a gate and a source, and a first resistor R1 connected between the source of the first MOS transistor M1 and a ground. The drain of the first MOS transistor M1 is connected to the light emitting unit 50 having one terminal and the other terminal, for example, connected to the other terminal thereof. The one terminal of the light emitting unit 50 is connected to a power supply terminal receiving an operating power Vdd. Herein, a plurality of LEDs may be connected between the one terminal and the other terminal of the light emitting unit 50 in series or in parallel or in series and parallel.

Further, the constant current circuit unit 80 may include an amplifier 81 having a first input terminal receiving a voltage detected by the first resistor R1, a second input terminal receiving a predetermined voltage VDC1, and an output terminal outputting a difference voltage corresponding to an error between a voltage through the first input terminal and a voltage through the second input terminal.

Referring to FIGS. 1 and 3, the frequency selector 200 may set the cycle of the high-speed counting clock HCLK to be shorter than the cycle of the reference clock CLK.

The PWM signal generator 300 may convert the digital signal from the A/D converter 100 into a ratio value corresponding to a ratio for the reference voltage and generate a PWM signal Spwm in which a section corresponding to a value generated by multiplying the counting number CTN from the frequency selector 200 by the ratio value is set to be a high section in one cycle of the reference clock CLK and the remainder section of one cycle of the reference clock CLK is set to be a low section.

The PWM signal generator 300 may set the high section of the PWM signal Spwm to be a section including the number of high-speed counting clocks HCLK corresponding to an integer in the value acquired by multiplying the ratio value by the counting number CTN, and may set the low section in the PWM signal Spwm to a section including the number of high-speed counting clocks HCLK corresponding to a value acquired by subtracting the number of high-speed counting clocks HCLK of the high section from the total count number in the one-cycle section of the reference clock CLK.

Referring to FIG. 3, the light emitting element of the light emitting unit 50 may be constituted by an LED element.

Figure 4:
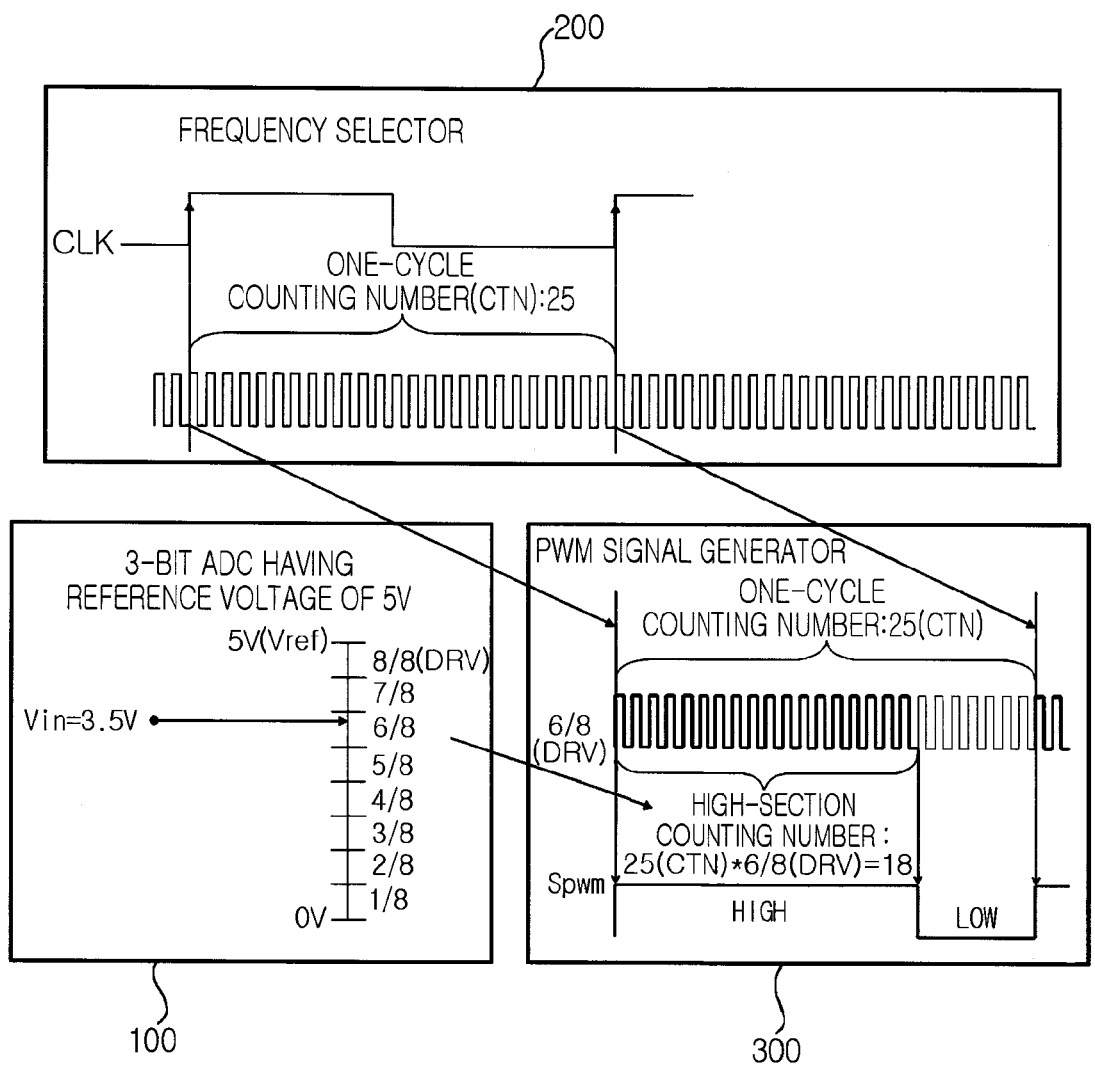
FIG. 4 describes an operation of a digital PWM generator according to exemplary embodiments of the present invention.

FIG. 4 describes an operation of a digital PWM generator according to exemplary embodiments of the present invention. In FIG. 4, when the A/D converter 100 sets the reference voltage Vref to 5V and sets the input voltage Vin to 3.5V to have a 3-bit resolution, an operation of the A/D converter 100 is shown.

In this case, when the PWM signal generator 300 divides 5V, the reference voltage Vref corresponding to the full-scale range FSR of the A/D converter 100 with the 3-bit resolution, the reference voltage Vref is divided into eight sections 23, and since the input voltage Vin, 3.5V corresponds to a sixth high section among the eight plural sections, the ratio value DRV is 6/8.

Further, when the frequency selector 200 sets the cycle of the high-speed counting clock HCLK to be 25 times higher than the reference clock CLK, an operation of the frequency selector 200 is shown.

In this case, 25 pulses of the high-speed counting clock HCLK may be included in one cycle of the reference clock CLK.

In addition, when the counting number CTN from the frequency selector 200 is 25 and the ratio value of the PWM signal generator 300 is 6/8, the PWM signal generator 300 generates a PWM signal Spwm having a high level during a section corresponding to 18 pulses among 25 pulses of the entire section during the high section in one cycle of the reference clock CLK.

Hereinafter, operations and effects according to embodiments of the present invention will be described with reference to the accompanying drawings.

Referring to FIGS. 1 to 3, the digital PWM generator 100 according to the first and second exemplary embodiments of the present invention will be described.

Referring to FIG. 1, the A/D converter 100 according to the first and second exemplary embodiments of the present invention partitions a predetermined reference voltage Vref into a plurality of sections corresponding to a predetermined first set value, and converts a value corresponding to a section corresponding to a section to which the magnitude of the input voltage Vin corresponds among the plurality of sections into the digital signal, and provides the digital signal to the PWM signal generator 300.

Further, the frequency selector 200 according to the first and second exemplary embodiments of the present invention provides a counting number CTN to the PWM signal generator 300 by counting a predetermined high-speed counting clock HCLK during a one-cycle section of a predetermined reference clock CLK.

More in detail, the frequency selector 200 may set the cycle of the high-speed counting clock HCLK to be shorter than the cycle of the reference clock CLK, and for example, as shown in FIG. 4, the frequency selector 200 may set the cycle of the high-speed counting clock HCLK to be 25 times higher than the reference clock CLK.

In addition, the PWM signal generator 300 according to the first and second embodiments of the present invention converts the digital signal from the A/D converter 100 into a ratio value DRV corresponding to a ratio for the reference voltage, and generates a PWM signal Spwm having a controlled duty ratio of the reference clock CLK by using the ratio value and the counting number CTN from the frequency selector 200.

The PWM signal generator 300 may convert the digital signal from the A/D converter 100 into a ratio value corresponding to a ratio for the reference voltage, and generate a PWM signal Spwm in which a section corresponding to a value generated by multiplying the counting number CTN from the frequency selector 200 by the ratio value is set to be a high section in one cycle of the reference clock CLK and in which the remainder section of one cycle of the reference clock CLK is set to be a low section.

For example, the PWM signal generator 300 may set the high section of the PWM signal Spwm to be a section including the number of high-speed counting clocks HCLK corresponding to an integer in the value acquired by multiplying the ratio value DRV by the counting number CTN, and may set the low section in the PWM signal Spwm to a section including the number of high-speed counting clocks HCLK corresponding to a value acquired by subtracting the number of high-speed counting clocks HCLK of the high section from the total count number in the one-cycle section of the reference clock CLK.

Referring to FIG. 2, one exemplary embodiment of the PWM signal generator 300 will be described.

Referring to FIG. 2, the PWM signal generator 300 may include a ratio calculating unit 310, a multiplying unit 320, and a PWM generator 330. In this case, the ratio calculating unit 310 may calculate a ratio (Vin/FSR=DRV) of an input voltage Vin equivalent to a full-scale range FSR of the A/D converter 100.

Further, the multiplying unit 320 multiplies the counting number CTN from the frequency selector 200 by the ratio value DRV from the ratio calculating unit 310.

In addition, the PWM generator 330 may determine a multiplication value calculated by the multiplying unit 320 as the width of a high section, and generate a PWM signal maintained as a high level corresponding to the width of the high section during one cycle of a PWM and maintained as a low level in the remainder section of one cycle of the PWM.

Meanwhile, referring to FIG. 3, in the apparatus for driving a light emitting device according to the second exemplary embodiment of the present invention, constant current circuit unit 80 controls a current flowing in light emitting unit 50 including a plurality of light emitting elements.

More in detail, the constant current circuit unit 80 will be described.

Referring to FIG. 3, current flows in the light emitting unit 50 by an operating power Vdd and this current is detected as a voltage by a first resistor R1 and supplied to a first input terminal of an amplifier 81.

In this, case, a difference voltage corresponding to an error between a voltage inputted through the first input terminal of the amplifier 81 and a predetermined voltage VDC1 inputted through a second input terminal is supplied to a first MOS transistor M1 connected between the light emitting unit 50 and the resistor R1.

As a result, the first MOS transistor M1 may control the current flowing in the light emitting unit 50 according to the difference voltage from the amplifier 81.

Further, the amplifier 81 may be turned on or turned off in response to the PWM signal Spwm. For example, the amplifier 81 may be turned on in a high level of the PWM signal Spwm and the amplifier 81 may be turned off in a low level of the PWM signal Spwm.

Referring to FIG. 4, one detailed exemplary embodiment of the digital PWM generator 100 according to the first and second exemplary embodiments of the present invention will be described.

Referring to FIG. 4, when the A/D converter 100 sets the reference voltage Vref to 5V and sets the input voltage Vin to 3.5V to have a 3-bit resolution, the PWM signal generator 300 generates a ratio value 6/8 to which the input voltage Vin, 3.5V corresponds among 8 sections in which the reference voltage Vref, 5V is divided by the 3-bit resolution.

That is, in the digital signal of the A/D converter 100, when 5V, the reference voltage Vref is divided by the 3-bit resolution, the reference voltage Vref may be divided into eight sections 23, and since the input voltage Vin, 3.5V corresponds to a sixth high section among the eight plural sections, the ratio value of the PWM signal generator 300 is 6/8.

Further, when the frequency selector 200 sets the cycle of the high-speed counting clock HCLK to be 25 times higher than the reference clock CLK, 25 pulses of the high-speed counting clock HCLK are included in one cycle of the reference clock CLK.

Accordingly, the frequency selector 200 may count the number of pulses of the high-speed counting clock HCLK during one cycle of the reference clock CLK, and provide the counting number CTN, 25 to the PWM signal generator 300.

In addition, when the counting number CTN from the frequency selector 200 is 25 and the ratio value of the PWM signal generator 300 is 6/8, the PWM signal generator 300 may generate a PWM signal Spwm having a high level during a section corresponding to 18 pulses among 25 pulses of the entire section during the high section in one cycle of the reference clock CLK, and provide the generated PWM signal to the amplifier 81.

In the exemplary embodiment of the present invention, in the case in which a voltage input range of the A/D converter is, for example, in the range of −FS/2 to +FS/2, when the full voltage is applied as +FS/2; a duty ratio is 100%, and when a minimum voltage is applied as −FS/2; the duty ratio is 0%. The PWM signal having the duty ratio in the range of 0 to 100% can be generated by controlling the voltage, and the LED can flicker at an accurate duty ratio by actuating the constant current circuit unit 80 by using the generated PWM signal.

In this case, a luminance control resolution may depend on an A/D conversion resolution of the A/D converter and when the A/D resolution increases, the duty ratio may be more minutely controlled.

As set forth above, a minute PWM signal can be generated by generating a PWM signal based on a digital signal acquired by analog/digital (A/D)-converting an input voltage so as to minutely control an adopted system.

While the present invention has been shown and described in connection with the exemplary embodiments, it will be apparent to those skilled in the art that modifications and variations can be made without departing from the spirit and scope of the invention as defined by the appended claims.

What is claimed is:

1. A digital PWM generator, comprising:
   an A/D converter dividing a predetermined reference voltage into a plurality of sections corresponding to a predetermined first set value, searching a section to which the magnitude of an input voltage corresponds, among the plurality of sections, and converting a value corresponding to the searched section into a digital signal;
   a frequency selector providing a counting number by counting a high-speed counting clock of which the cycle is set to be shorter than that of the cycle of the reference clock during a one-cycle section of a predetermined reference clock; and
   a PWM signal generator converting the digital signal from the A/D converter into a ratio value corresponding to a ratio for the reference voltage and generating a PWM signal having a controlled duty ratio of the reference clock by using the ratio value and the counting number from the frequency selector.

2. The digital PWM generator of claim 1, wherein the first set value is set to be a value corresponding to an A/D conversion resolution of the A/D converter.

3. The digital PWM generator of claim 1, wherein the frequency selector sets the cycle of the high-speed counting clock to be shorter than that of the reference clock.

4. The digital PWM generator of claim 3, wherein the PWM signal generator generates a PWM signal by controlling a high section during a duty within one cycle of the reference clock.

5. The digital PWM generator of claim 4, wherein the PWM signal generator converts the digital signal from the A/D converter into a ratio value corresponding to a ratio for the reference voltage and generates a PWM signal in which a section corresponding to a value generated by multiplying the counting number from the frequency selector by the ratio value is set to be a high section in one cycle of the reference clock and the remainder of a section in one cycle of the reference clock is set to be a low section.

6. The digital PWM generator of claim 5, wherein the PWM signal generator sets the high section of the PWM signal to be a section including the number of high-speed counting clocks corresponding to an integer in the value acquired by multiplying the ratio value by the counting number, and sets the low section in the PWM signal to be a section including the number of high-speed counting clocks corresponding to a value acquired by subtracting the number of high-speed counting clocks of the high section from the total count number in the one-cycle section of the reference clock.

7. The digital PWM generator of claim 5, wherein the PWM signal generator includes:
   a ratio calculating unit calculating a ratio of an input voltage equivalent to a full-scale range of the A/D converter;
   a multiplying unit multiplying the counting number from the frequency selector by the ratio value from the ratio calculating unit; and
   a PWM generator determining a multiplication value calculated by the multiplying unit as a width of a high section, and generating a PWM signal maintained as a high level corresponding to the width of the high section during one cycle of a PWM and maintained as a low level in the remainder section of one cycle of the PWM.

8. The digital PWM generator of claim 1, wherein the reference clock of the frequency selector is any one selected from an external variable clock and an internal fixed clock.

9. An apparatus for driving a light emitting device, the apparatus comprising:
- a constant current circuit unit controlling a current flowing in a light emitting unit including a plurality of light emitting elements;
- an A/D converter dividing a predetermined reference voltage into a plurality of sections corresponding to a predetermined first set value and converting a value corresponding to a section to which the magnitude of an input voltage corresponds, among the plurality of sections, into a digital signal;
- a frequency selector providing a counting number by counting a predetermined high-speed counting clock during a one-cycle section of a predetermined reference clock; and
- a PWM signal generator converting the digital signal from the A/D converter into a ratio value corresponding to a ratio for the reference voltage, and generating a PWM signal having a controlled duty ratio of the reference clock by using the ratio value and the counting number from the frequency selector and providing the generated PWM signal to the constant current circuit unit.

10. The apparatus of claim 9, wherein the first set value is set to be a value corresponding to an A/D conversion resolution of the A/D converter.

11. The apparatus of claim 10, wherein the frequency selector sets the cycle of the high-speed counting clock to be shorter than the cycle of the reference clock.

12. The apparatus of claim 11, wherein the PWM signal generator generates a PWM signal by controlling a high section during a duty within one cycle of the reference clock.

13. The apparatus of claim 11, wherein the PWM signal generator converts the digital signal from the A/D converter into a ratio value corresponding to a ratio for the reference voltage, and generates a PWM signal in which a section corresponding to a value generated by multiplying the counting number from the frequency selector by the ratio value is set to be a high section in one cycle of the reference clock and the remainder section of one cycle of the reference clock is set to be a low section.

14. The apparatus of claim 11, wherein the PWM signal generator sets the high section of the PWM signal to be a section including the number of high-speed counting clocks corresponding to an integer in the value acquired by multiplying the ratio value by the counting number, and sets the low section in the PWM signal to be a section including the number of high-speed counting clocks corresponding to a value acquired by subtracting the number of high-speed counting clocks of the high section from the total count number in the one-cycle section of the reference clock.

15. The apparatus of claim 10, wherein the reference clock of the frequency selector is any one selected from an external variable clock and an internal fixed clock.

16. The apparatus of claim 15, wherein the PWM signal generator includes:
- a ratio calculating unit calculating a ratio of an input voltage equivalent to a full-scale range of the A/D converter;
- a multiplying unit multiplying the counting number from the frequency selector by the ratio value from the ratio calculating unit; and
- a PWM generator determining a multiplication value calculated by the multiplying unit as a width of a high section, and generating a PWM signal maintained as a high level corresponding to the width of the high section during one cycle of a PWM and maintained as a low level in the remainder section of one cycle of the PWM.

17. The apparatus of claim 16, wherein the constant current circuit unit includes:
- a first MOS transistor having a gate, a source, and a drain that is connected to one terminal of the light emitting unit having the one terminal and the other terminal, the other terminal being connected to a power supply terminal receiving an operating power;
- a first resistor connected between a source and of the first MOS transistor and a ground; and
- an amplifier having a first input terminal receiving a voltage detected by the first resistor, a second input terminal receiving a predetermined voltage, and an output terminal outputting a difference voltage corresponding to an error between a voltage through the first input terminal and a voltage through the second input terminal.

18. The apparatus of claim 9, wherein the light emitting element of the light emitting unit is an LED device.

* * * * *